US012597631B2

(12) United States Patent
Saito et al.

(10) Patent No.: US 12,597,631 B2
(45) Date of Patent: Apr. 7, 2026

(54) RESTRAINING MEMBER AND POWER STORAGE DEVICE

(71) Applicant: TOYOTA JIDOSHA KABUSHIKI KAISHA, Toyota (JP)

(72) Inventors: Akinori Saito, Kariya (JP); Shinji Suzuki, Kariya (JP); Yuya Sato, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 676 days.

(21) Appl. No.: 18/068,551

(22) Filed: Dec. 20, 2022

(65) Prior Publication Data

US 2023/0307693 A1 Sep. 28, 2023

(30) Foreign Application Priority Data

Mar. 11, 2022 (JP) ................................. 2022-038299

(51) Int. Cl.
*H01M 50/264* (2021.01)
*H01M 10/04* (2006.01)
*H01M 50/342* (2021.01)

(52) U.S. Cl.
CPC ..... *H01M 10/0481* (2013.01); *H01M 50/264* (2021.01); *H01M 50/342* (2021.01)

(58) Field of Classification Search
CPC ... H01M 50/264; H01M 50/342; H01M 10/04
See application file for complete search history.

(56) References Cited

U.S. PATENT DOCUMENTS

| | | | | |
|---|---|---|---|---|
| 5,002,841 A | * | 3/1991 | Belongia | ............... H01M 50/77 |
| | | | | 429/70 |
| 5,114,807 A | | 5/1992 | Rowlette | |

FOREIGN PATENT DOCUMENTS

| | | |
|---|---|---|
| JP | 2007165698 A | 6/2007 |
| JP | 5954258 B2 | 7/2016 |
| JP | 2021082407 A | 5/2021 |

* cited by examiner

*Primary Examiner* — Kenneth J Douyette
(74) *Attorney, Agent, or Firm* — SoraIP, Inc.

(57) ABSTRACT

A restraining member includes a pair of interposing portions, a plurality of pressurizing portions, and a pair of pressing portions. Each pressurizing portion has the shape of which a dimension in a third direction perpendicular to both a first direction and a second direction is longer than a dimension in the first direction and a dimension in the second direction and is in contact with the interposing portion and the pressing portion. Each interposing portion includes a pressurized area overlapping each pressurizing portion in the first direction and a low pressurized area not overlapping the pressurizing portion in the first direction.

6 Claims, 5 Drawing Sheets

FIRST DIRECTION

SECOND DIRECTION

THIRD DIRECTION

FIRST DIRECTION

SECOND DIRECTION

FIRST DIRECTION

SECOND DIRECTION

FIRST DIRECTION

SECOND DIRECTION

FIRST DIRECTION

SECOND DIRECTION

FIRST DIRECTION

SECOND DIRECTION

THIRD DIRECTION

FIRST DIRECTION

SECOND DIRECTION

RESTRAINING MEMBER AND POWER STORAGE DEVICE

CROSS-REFERENCE TO RELATED APPLICATION

This application claims priority to Japanese Patent Application No. 2022-038299 filed on Mar. 11, 2022, incorporated herein by reference in its entirety.

BACKGROUND

1. Technical Field

The present disclosure relates to a restraint member and a power storage device.

2. Description of Related Art

For example, Japanese Unexamined Patent Application Publication No. 2021-82407 (JP 2021-82407 A) discloses a battery module including a stacked body in which a plurality of battery cells are stacked and a pressurizing mechanism that presses the stacked body in a stacking direction.

SUMMARY

In the battery module described in JP 2021-82407 A, there is room for improvement in discharging gas generated in a power storage cell.

The present disclosure provides a restraining member and a power storage device capable of facilitating discharge of gas generated in a power storage module.

A restraining member according to a first aspect of the present disclosure includes a pair of interposing portions, a plurality of pressurizing portions, and a pair of pressing portions. The interposing portions interpose a power storage module including a plurality of power storage cells stacked in a first direction between the interposing portions from both sides in the first direction. The pressurizing portions are arranged in a row outside each of the interposing portions in the first direction and spaced apart from each other in a second direction perpendicular to the first direction. The pressing portions are arranged outside the pressurizing portions in the first direction. Each of the pressing portions presses the corresponding pressurizing portions toward the corresponding interposing portion. Each of the pressurizing portions has a shape of which a dimension in a third direction perpendicular to both the first direction and the second direction is longer than a dimension in the first direction and a dimension in the second direction, and is in contact with the interposing portion and the pressing portion. Each of the interposing portions includes a pressurized area overlapping each of pressurizing portions in the first direction and a low pressurized area not overlapping the pressurizing portions in the first direction.

In the first aspect, each of pressurizing portions may include a pair of high pressurizing portions spaced apart from each other in the second direction and in contact with the interposing portion and the pressing portion, and an intermediate pressurizing portion connecting the high pressurizing portions and in contact with the interposing portion. The pressurized area may include a pair of high pressurized areas each of which overlaps each of the high pressurizing portions in the first direction and receives pressure from each of the high pressurizing portions and an intermediate pressurized area overlapping the intermediate pressurizing portion in the first direction and receiving pressure from the intermediate pressurizing portion.

In the first aspect, each of the pressurizing portions may further include a connecting portion connecting outer end portions of the high pressurizing portions in the first direction and in contact with the pressing portion.

In the first aspect, each of the pressurizing portions may be hollow.

In the first aspect, each of the pressurizing portions may be a pipe with a rectangular or square cross-section.

In the first aspect, each of the pressurizing portions may have a honey comb structure formed in a hexagonal cylindrical shape of which a central axis is parallel to the first direction.

In the first aspect, each of the pressing portions may have a higher bending stiffness than each of the interposing portions.

In the first aspect, an outer shape of the power storage module in plan view may be formed in a rectangular shape with one side having a length of 0.2 m or more, and an outer shape of an area in which the pressurizing portions are arranged in plan view may be formed to be the same as or larger than the outer shape of the power storage module in plan view.

A power storage device according to a second aspect of the present disclosure includes the restraining member and the power storage module. The power storage module is restrained from both sides in the first direction by the restraining member.

With each aspect of the present disclosure, it is possible to provide a restraining member and a power storage device capable of facilitating discharge of gas generated in the power storage module.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
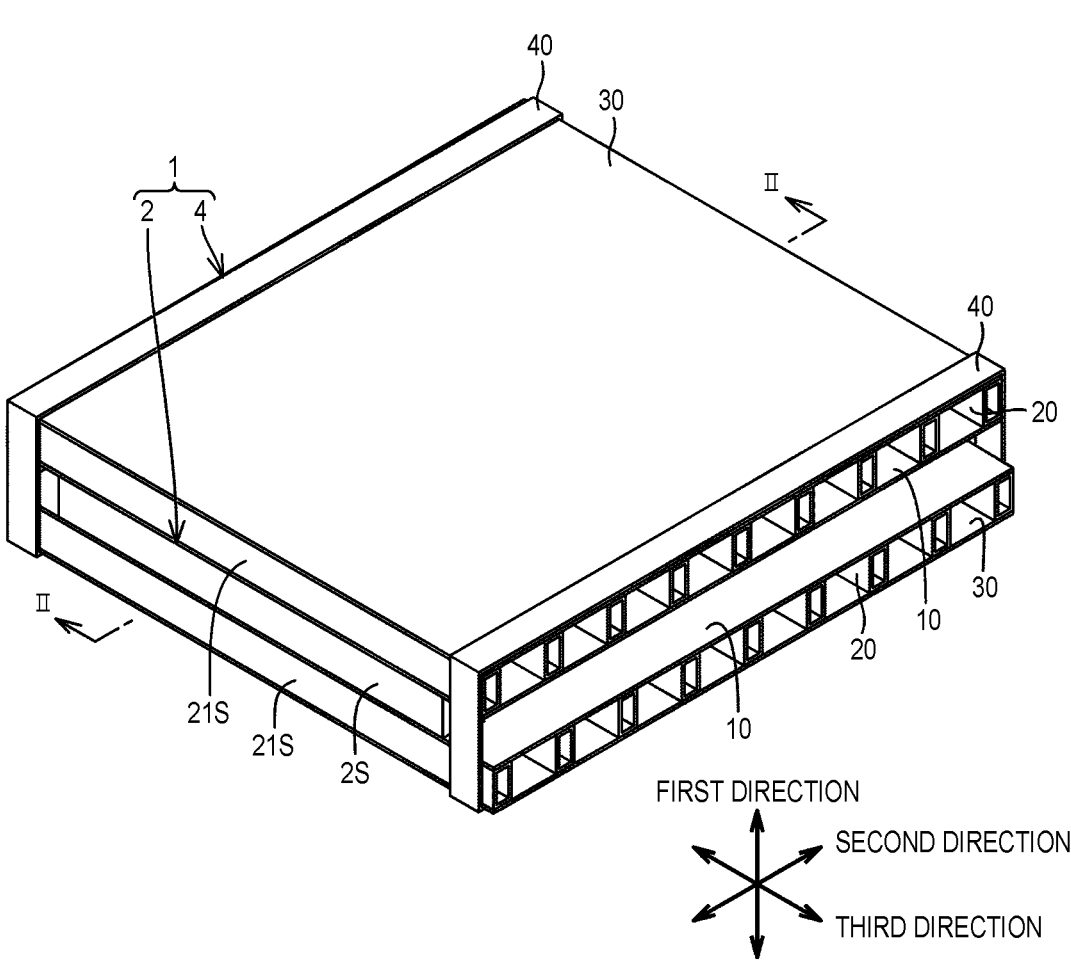
FIG. 1 is a schematic perspective view of a power storage device including a restraining member of an embodiment of the present disclosure.

Embodiments of the present disclosure will be described with reference to the drawings. In the drawings referred to below, the same or corresponding members are given the same numerals and letters.

Figure 2:
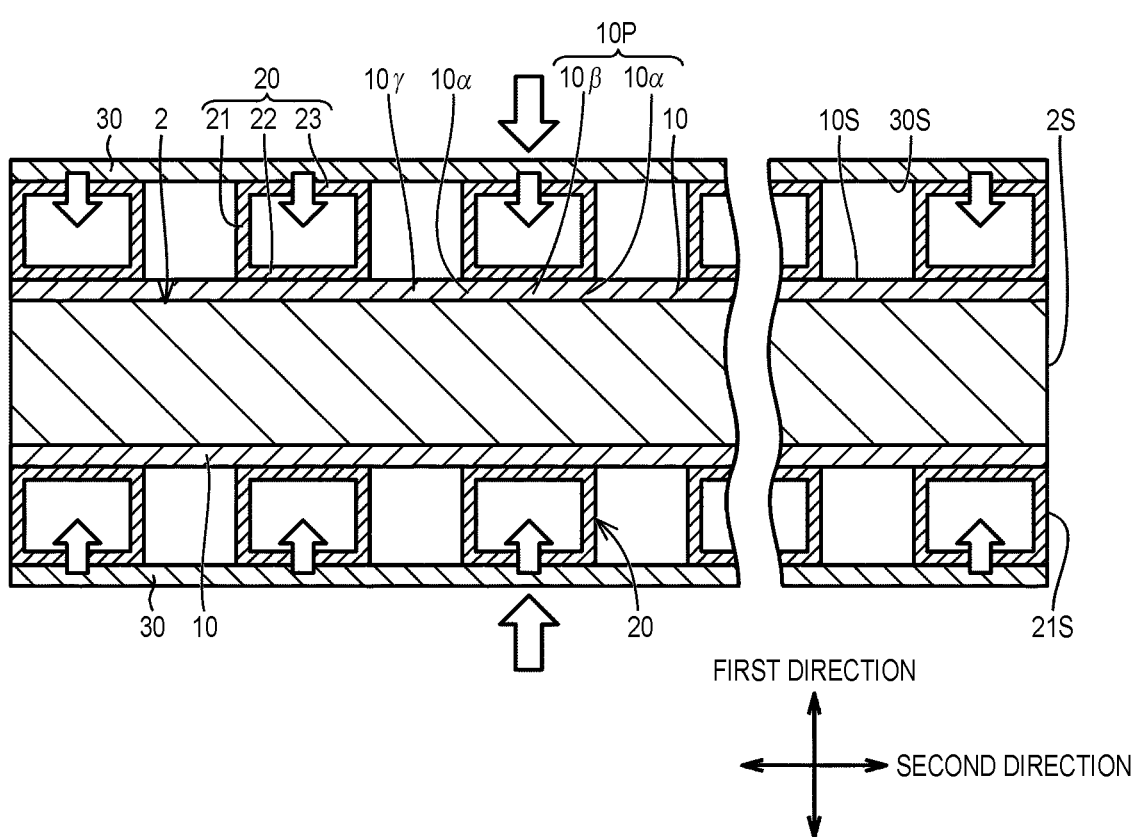
FIG. 2 is a cross-sectional view taken along the line II-II in FIG. 1.

FIG. 1 is a perspective view schematically illustrating a power storage device including a restraining member according to an embodiment of the present disclosure. FIG. 2 is a cross-sectional view taken along the line II-II in FIG.

1. As illustrated in FIGS. 1 and 2, a power storage device 1 includes a power storage module 2 and a restraining member 4.

The power storage module 2 includes a plurality of power storage cells 2a (see FIG. 3) stacked in a first direction. As illustrated in the enlarged view of a part of the power storage cell 2a in FIG. 3, the power storage module 2 may be a bipolar battery where, for example, a plurality of electrodes including a bipolar electrode in which a positive electrode layer 102 is formed on one surface of a current collector 101 and a negative electrode layer 103 is formed on the other surface of the current collector 101 are alternately stacked with separators 110 in the first direction, or a monopolar battery. The power storage module 2 is formed in, for example, a rectangular shape with one side having a length of 0.2 m or more in plan view.

The restraining member 4 is preferably used for restraining the power storage module 2. The restraining member 4 is a member that restrains the power storage module 2 from both sides in the first direction. As illustrated in FIG. 1, the restraining member 4 includes a pair of interposing portions 10, a plurality of pressurizing portions 20, a pair of pressing portions 30, and a tightening member 40.

The pair of interposing portions 10 interposes the power storage module 2 including the power storage cells 2a between the interposing portions from both sides in the first direction. Each interposing portion 10 is formed in a flat plate shape. The outer shape of each interposing portion 10 in plan view is larger than the outer shape of the power storage module 2 in plan view: The thickness of each interposing portion 10 is set to, for example, 10 mm or less. Each interposing portion 10 is made of aluminum or the like.

Each pressurizing portion 20 is arranged outside each of the interposing portions 10 in the first direction. As illustrated in FIG. 2, the pressurizing portions 20 arranged outside one interposing portion 10 and the pressurizing portions 20 arranged outside the other interposing portion 10 face each other in the first direction with the power storage module 2 interposed therebetween. Each pressurizing portion 20 is in contact with an outer surface 10S of the interposing portion 10 in the first direction. The pressurizing portions 20 are arranged in a row so as to be spaced apart from each other in a second direction perpendicular to the first direction. It is preferable that the pressurizing portions 20 be arranged in the second direction at regular intervals. Each pressurizing portion 20 has a shape extending in a third direction perpendicular to both the first direction and the second direction. Specifically, the dimension of the pressurizing portion 20 in the third direction is larger than the dimension of the pressurizing portion 20 in the first direction and the dimension of the pressurizing portion 20 in the second direction. In the present embodiment, each of pressurizing portions 20 is formed of a so-called square pipe, which is obtained by molding a belt-shaped plate material having a uniform thickness into a hollow cylindrical square or rectangular pipe. That is, each of pressurizing portions 20 is formed in a square or rectangular tubular shape extending with the third direction as its longitudinal direction and having a square or rectangular cross section perpendicular to the third direction. Each pressurizing portion 20 is made of aluminum or the like.

The outer shape of the area (hereinafter referred to as a "pressurized area") where the pressurizing portions 20 are arranged in plan view can be appropriately set depending on the size of the power storage module 2. The outer shape of the pressurized area is preferably formed to be the same as or larger than the outer shape of the power storage module 2 in plan view: For example, when the outer shape of the power storage module 2 has a rectangular shape with a side having a length of 0.2 m in plan view; the outer shape of the pressurized area has a rectangular shape with a side having a length of 0.2 m or more. In the present embodiment, the length of each of pressurizing portions 20 in the third direction is set to be equal to or longer than the length of the power storage module 2 in the third direction. In addition, the outermost pressurizing portion 20 in the second direction from among the pressurizing portions 20 is arranged in contact with an end portion of the power storage module 2, and an outer surface 21S of the outermost pressurizing portion 20 in the second direction is flush with or outside an outer surface 2S of the power storage module 2 in the second direction.

Each pressurizing portion 20 has a pair of high pressurizing portions 21, an intermediate pressurizing portion 22, and a connecting portion 23.

The high pressurizing portions 21 face each other with an interval in the second direction. In the present embodiment, each high pressurizing portion 21 is composed of a flat plate portion perpendicular to the second direction. Each high pressurizing portion 21 is in contact with the outer surface 10S of the interposing portion 10 in the first direction.

The intermediate pressurizing portion 22 connects the high pressurizing portions 21 to each other. In the present embodiment, the intermediate pressurizing portion 22 is composed of a flat plate portion perpendicular to the first direction. The intermediate pressurizing portion 22 is in contact with the outer surface 10S of the interposing portion 10 in the first direction.

The connecting portion 23 connects outer end portions of the high pressurizing portions 21 in the first direction. In the present embodiment, the connecting portion 23 is composed of a flat plate portion perpendicular to the first direction.

One pressing portion 30 presses the pressurizing portions 20 toward one of the interposing portions 10, and the other pressing portion 30 presses the pressurizing portions 20 toward the other of the interposing portions 10. Each pressing portion 30 is arranged outside the pressurizing portions 20 in the first direction. Each pressing portion 30 is formed in a flat plate shape. The connecting portion 23 of each of pressurizing portions 20 is in contact with an inner surface 30S of the pressing portion 30 in the first direction. The outer shape of each of pressing portions 30 in plan view is larger than the outer shape of the power storage module 2 in plan view. In addition, it is preferable that the outer shape of each of pressing portions 30 in plan view be formed to be the same as or larger than the pressurized area in plan view: The thickness of each of pressing portions 30 may be, for example, 10 mm or less. The thickness or Young's modulus of each of pressing portions 30 may be greater than the thickness or Young's modulus of each interposing portion 10 such that the bending stiffness of each of pressing portions 30 is higher than that of each interposing portion 10. Each pressing portion 30 is made of aluminum or the like.

Figure 3:
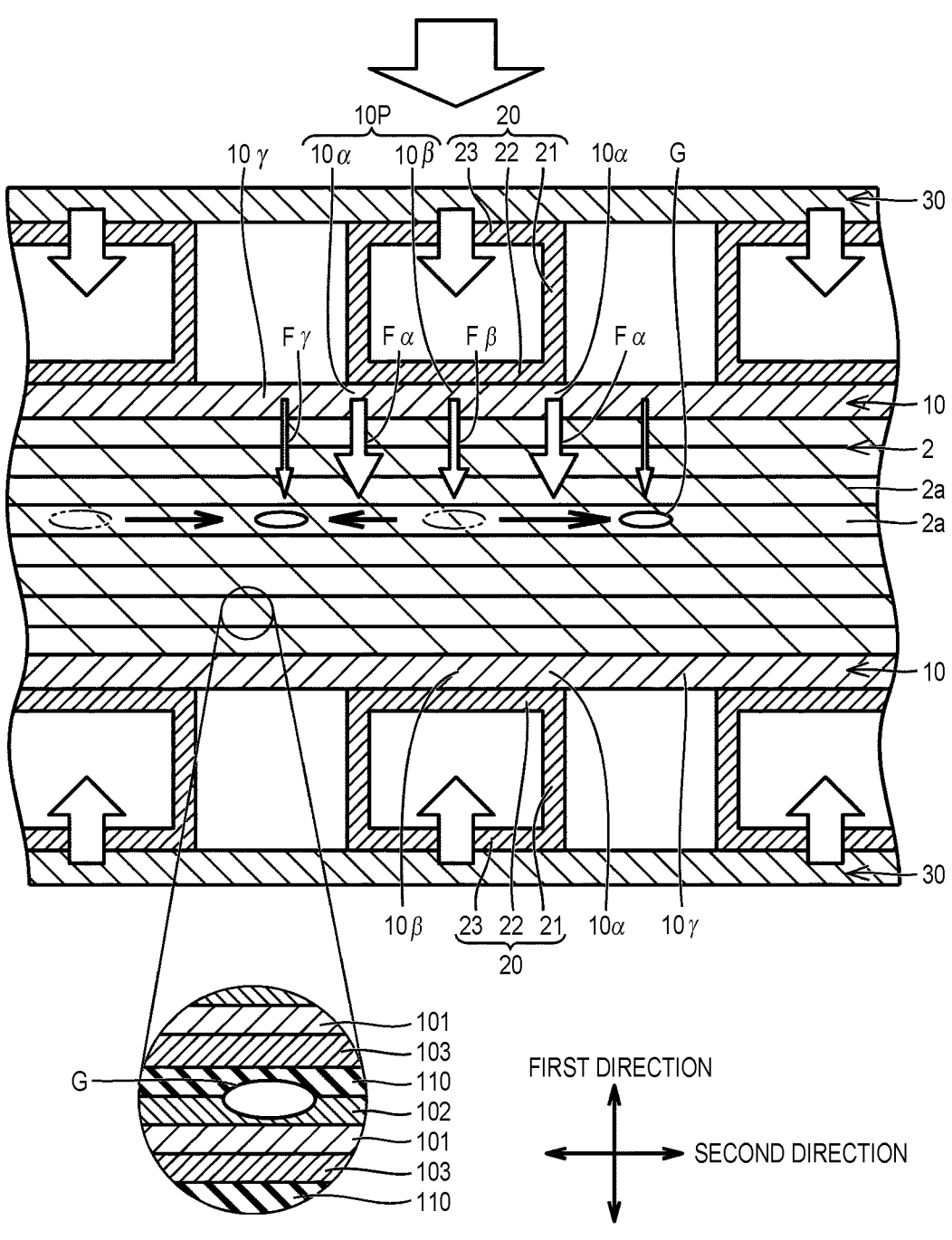
FIG. 3 is a view schematically illustrating behavior of gas generated in a power storage cell.

The tightening member 40 tightens the pair of pressing portions 30 from both sides in the first direction. The tightening member 40 tightens the pair of pressing portions 30 such that a pressing force of 10 N to 400 N acts on each of pressing portions 30. The tightening member 40 is attached to an end portion of each of pressing portions 30 in the third direction. The tightening member 40 consists of, for example, a band. In addition, a plurality of tightening members 40 may be provided at an intermediate portion of each of pressing portions 30 in the third direction in addition to the end portion of each of pressing portions 30 in the third direction. Further, the tightening member 40 may be configured to tighten the pressing portions 30 from both sides in the first direction with fastening members such as bolts. As illustrated in FIGS. 2 and 3, tightening by the tightening member 40 forms a pressurized area 10P and a low pressurized area 10γ in each interposing portion 10.

The pressurized area 10P is an area overlapping each of pressurizing portions 20 in the first direction. The pressurized area 10P is an area that receives pressure from each of pressurizing portions 20. The pressurized area 10P has a pair of high pressurized areas 10α and an intermediate pressurized area 10β.

Each high pressurized area 10α is an area that overlaps with each high pressurizing portion 21 in the first direction and is an area that receives pressure from each high pressurizing portion 21.

The intermediate pressurized area 10B is an area that overlaps with the intermediate pressurizing portion 22 in the first direction and is an area that receives pressure from the intermediate pressurizing portion 22. As indicated by the arrow in FIG. 3, a force Fβ acting on the power storage module 2 from the intermediate pressurized area 10β is smaller than a force Fα acting on the power storage module 2 from the high pressurized area 10α.

The low pressurized area 10γ is an area that does not overlap each of pressurizing portions 20 in the first direction. As indicated by the arrow in FIG. 3, a force Fγ acting on the power storage module 2 from the low pressurized area 10γ is smaller than a force Fβ acting on the power storage module 2 from the intermediate pressurized area 10β.

As described above, in the restraining member 4 in the present embodiment, the force Fγ acting on each power storage cell 2a from the low pressurized area 10γ is smaller than the forces Fα and Fβ acting on each power storage cell 2a from the pressurized area 10P. Therefore, as illustrated in FIG. 3, gas G generated in the power storage module 2 moves from a portion overlapping the pressurized area 10P in the first direction of the power storage module 2 to a portion overlapping the low pressurized area 10γ in the first direction, and moves along the third direction. Therefore, the discharge of the gas G generated in the power storage module 2 is facilitated. In addition, in FIG. 3, the gas G before moving is illustrated by the two-dot chain line.

In addition, since each of pressurizing portions 20 has the high pressurizing portion 21 extending along the third direction, the bending stiffness of the restraining member 4 is increased. Therefore, bending of the interposing portion 10, the pressurizing portion 20, and the pressing portion 30 due to tightening by the tightening member 40 is reduced. Therefore, the restraining pressure of the power storage module 2 is effectively secured at a central portion of the restraining member 4 in the third direction.

Furthermore, since each of pressurizing portions 20 is hollow; the heat capacity and weight of the restraining member 4 are reduced.

Figure 4:
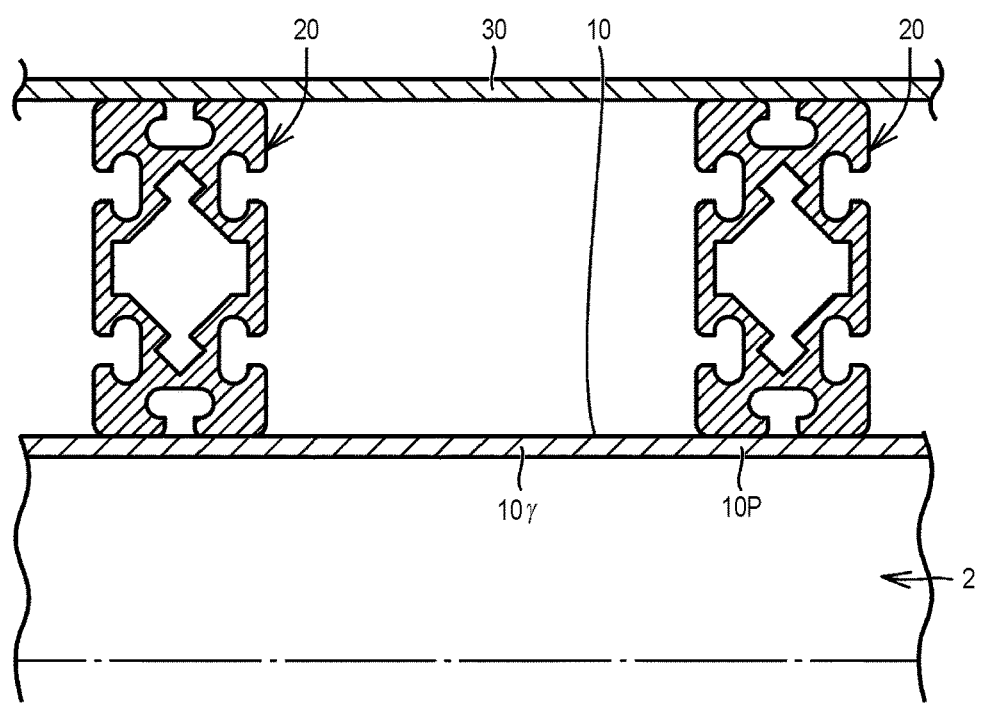
FIG. 4 is a cross-sectional view schematically illustrating a modification example of the restraining member.

In the above embodiment, as illustrated in FIG. 4, each of pressurizing portions 20 may be a general-purpose aluminum frame (aluminum frame with grooves formed on each side) generally known as a structural material. The grooves on each side extend in the third direction. In addition, in the embodiment illustrated in FIG. 2 and the embodiment illustrated in FIG. 4, the interposing portion 10 and the pressurizing portions 20 may be integrally formed.

Figure 5:
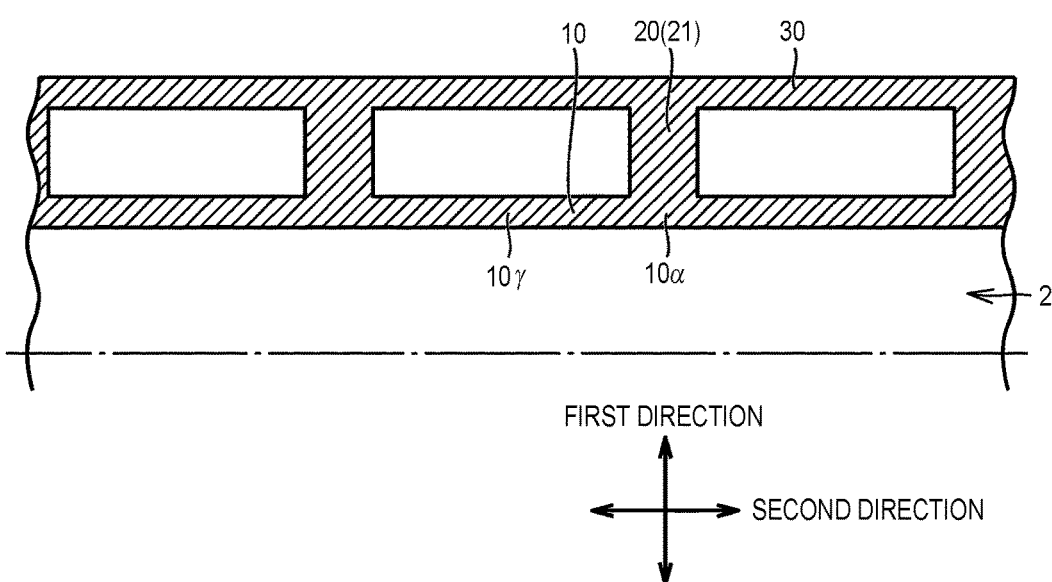
FIG. 5 is a cross-sectional view schematically illustrating a modification example of the restraining member.

In addition, as illustrated in FIG. 5, the interposing portion 10, the pressurizing portions 20, and the pressing portion 30 may be integrally formed by pultrusion, extrusion, or the like. In this example, each of pressurizing portions 20 consists only of the high pressurizing portion 21, and the interposing portion 10 has only the high pressure region 10α and the low pressure region 10γ.

Figure 6:
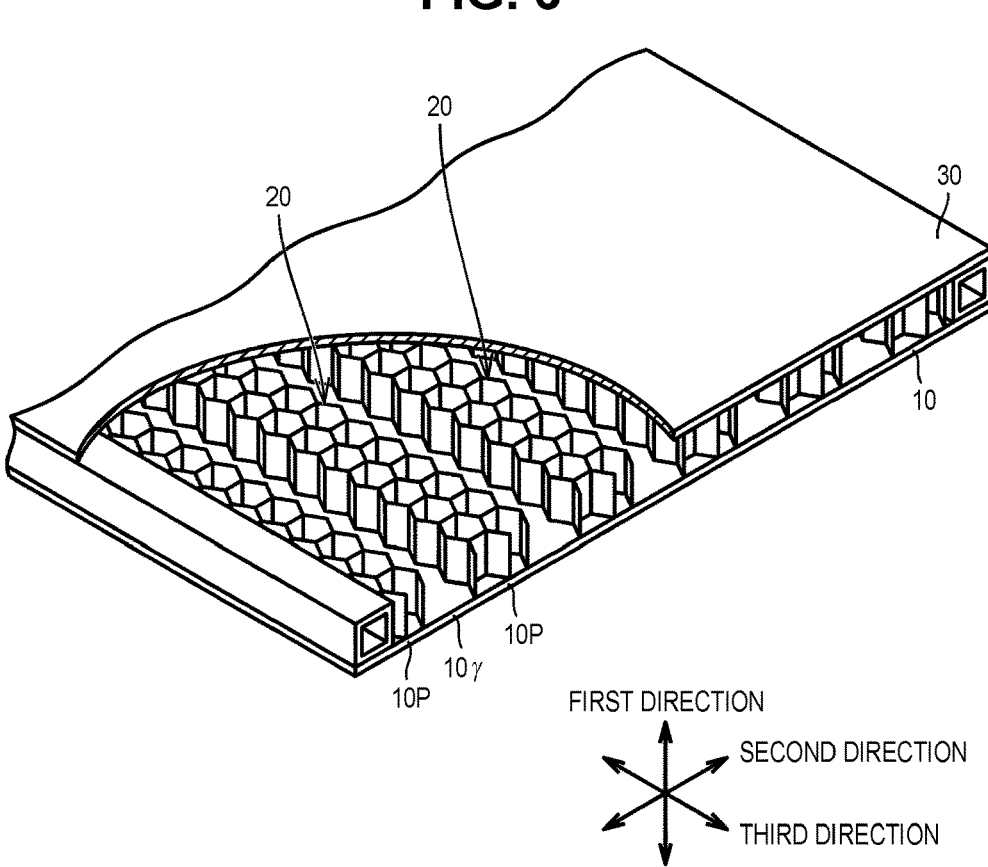
FIG. 6 is a perspective view schematically illustrating a modification example of the pressurizing portion.

In addition, as illustrated in FIG. 6, each of pressurizing portions 20 may be configured in a honeycomb structure. The honeycomb structure has a plurality of tubular portions, and each tubular portion is formed in a hexagonal tubular shape with its central axis parallel to the first direction. An adhesive member may be provided between each of pressurizing portions 20 and the pressing portion 30.

Figure 7:
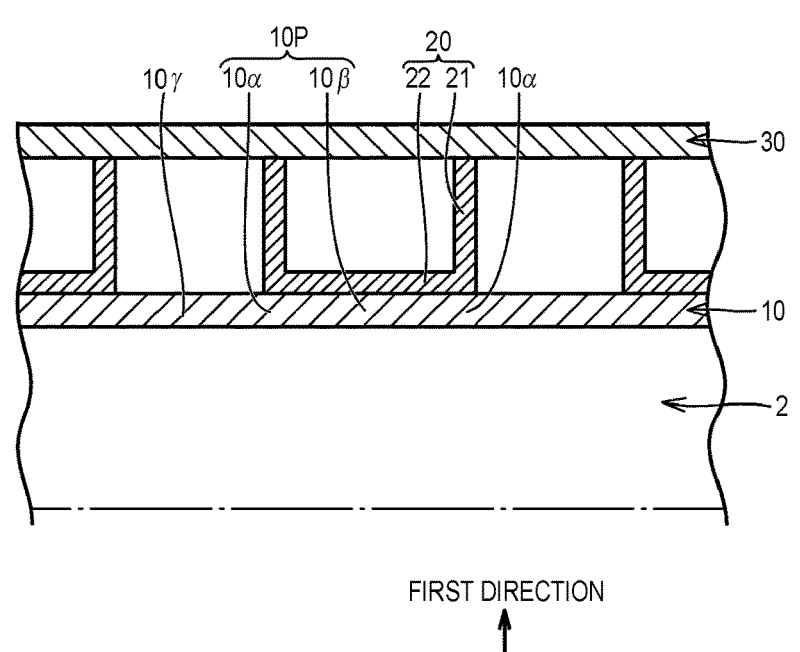
FIG. 7 is a cross-sectional view schematically illustrating a modification example of the pressurizing portion.

In addition, as illustrated in FIG. 7, the connecting portion 23 of the pressurizing portion 20 may be omitted.

It will be appreciated by those skilled in the art that the exemplary embodiments described above are specific examples of the following aspects.

The restraining member according to the above embodiment includes a pair of interposing portions that interposes a power storage module including a plurality of power storage cells stacked in a first direction between the interposing portions from both sides in the first direction, a plurality of pressurizing portions arranged in a row outside each of the interposing portions in the first direction and spaced apart from each other in a second direction perpendicular to the first direction, and a pair of pressing portions arranged outside the pressurizing portions in the first direction. Each pressing portions presses the corresponding pressurizing portions toward the corresponding interposing portions. Each of the pressurizing portions has a shape of which the dimension in a third direction perpendicular to both the first direction and the second direction is longer than the dimension in the first direction and the dimension in the second direction and is in contact with the interposing portion and the pressing portion, and each of the interposing portions includes a pressurized area overlapping each of pressurizing portions in the first direction and a low pressurized area not overlapping the pressurizing portion in the first direction.

In the restraining member, the force acting on the power storage module from the low pressurized area is smaller than the force acting on the power storage module from the pressurized area. Therefore, the gas generated in the power storage module moves from a portion overlapping the pressurized area in the first direction of the power storage module to a portion overlapping the low pressurized area in the first direction, and moves along the third direction. Therefore, the discharge of the gas generated in the power storage module is facilitated.

Further, each of pressurizing portions may include a pair of high pressurizing portions spaced apart from each other in the second direction and in contact with the interposing portion and the pressing portion and an intermediate pressurizing portion connecting the high pressurizing portions and in contact with the interposing portion, and the pressurized area may include a pair of high pressurized areas each of which overlaps each of the high pressurizing portions in the first direction and receives pressure from each of the high pressurizing portions and an intermediate pressurized area overlapping the intermediate pressurizing portion in the first direction and receiving pressure from the intermediate pressurizing portion.

In this way, the gas is effectively discharged from a portion of the power storage cell overlapping with the intermediate pressurized area in the first direction in addition to a portion overlapping with the low pressurized area in the first direction.

Each pressurizing portion may further include a connecting portion connecting outer end portions of the high pressurizing portions in the first direction and coming in contact with the pressing portion.

The outer shape of the power storage module in plan view is formed in a rectangular shape with one side having a length of 0.2 m or more, and the outer shape of an area in which the pressurizing portions are arranged in plan view is formed to be the same as or larger than the outer shape of the power storage module in plan view.

In this aspect, the entire area of the power storage module, which is formed in a rectangular shape with one side having a length of 0.2 m or more in plan view, can be restrained.

A power storage device according to the above embodiment includes the restraining member and the power storage module, where the power storage module is restrained from both sides in the first direction by the restraining member.

The embodiments disclosed herein are illustrative in all respects and should not be considered restrictive. The scope of the present disclosure is indicated by the scope of the claims rather than the description of the embodiments described above, and includes all modifications within the meaning and scope equivalent to the scope of the claims.

What is claimed is:

1. A restraining member comprising:
a pair of interposing portions that interposes a power storage module including a plurality of power storage cells stacked in a first direction between the interposing portions from both sides in the first direction, each of the pair of interposing portions being a flat plate;
a plurality of pressurizing portions arranged in a row outside each of the interposing portions in the first direction and spaced apart from each other in a second direction perpendicular to the first direction, each of the plurality of pressurizing portions being a hollow pipe having a square cross-section with a first side present in an inner side of the restraining member and a second side present in an outer side of the restraining member in the first direction, the first side and the second side being parallel to each other in the second direction, the hollow pipe extending in a third direction perpendicular to both the first direction and the second direction, and in contact with the interposing portion on the first side, a first outer surface of a first outermost pressurizing portion of the plurality of pressuring portions in the second direction being flush with a first outer surface of the power storage module in the second direction, and a length of each of the plurality of pressurizing portions in the third direction being longer than a length of the power storage module in the third direction;
a pair of pressing portions arranged outside the pressurizing portions in the first direction, each of the pressing portion being a flat plate extending, in the second direction, from an end of the first outermost pressurizing portion to an end the second outermost pressurizing portion, each of the pair of pression portions contacting with the second side of the plurality of pressurizing portions,
each of the pressing portions having a higher bending stiffness than the pair of interposing portions, and pressing the corresponding pressurizing portions toward the corresponding interposing portion, the first side of the plurality of pressurizing portions contacting the interposing portion and the second side of the plurality of pressurizing portions contacting the pressing portion; and a pair of tightening members attached to, and contacting with, an outer side of an end portion of each of the pair of pressing portions in the third direction, the pair of tightening members tightening the pair of pressing portions from both sides in the first direction such that a pressing force of 10 N to 400 N acts on each of the pressing portions,
wherein
each of the pressurizing portions has a shape of which a dimension in a third direction perpendicular to both the first direction and the second direction is longer than a dimension in the first direction and a dimension in the second direction,
each of the interposing portions includes:
a first pressurized area overlapping each of the pressurizing portions in the first direction and receiving pressure from each of the pressurizing portions; and
a second pressurized area not overlapping the pressurizing portions in the first direction, a force acting on the power storage module from the second pressurized area being smaller than a force acting on the power storage module from the first pressurized area, and
gas generated in the power storage module moves from the first pressurized area to the second pressurized area along the third direction, thereby facilitating discharge of the gas.

2. The restraining member according to claim 1, wherein:
each of the pressurizing portions includes:
a pair of high pressurizing portions spaced apart from each other in the second direction and in contact with the interposing portion and the pressing portion; and
an intermediate pressurizing portion connecting the high pressurizing portions and in contact with the interposing portion; and
the pressurized area includes:
a pair of high pressurized areas each of which overlaps each of the high pressurizing portions in the first direction and receives pressure from each of the high pressurizing portions; and
an intermediate pressurized area overlapping the intermediate pressurizing portion in the first direction and receiving pressure from the intermediate pressurizing portion.

3. The restraining member according to claim 2, wherein each of the pressurizing portions further includes a connecting portion connecting outer end portions of the high pressurizing portions in the first direction and in contact with the pressing portion.

4. The restraining member according to claim 1, wherein each of the pressurizing portions has a honeycomb structure formed in a hexagonal cylindrical shape of which a central axis is parallel to the first direction.

5. A power storage device comprising:
the restraining member according to claim 1; and
the power storage module,
wherein the power storage module is restrained from both sides in the first direction by the restraining member.

6. The restraining member according to claim 1, wherein a second outer surface of a second outermost pressurizing portion of the plurality of pressuring portions in the second direction is flush with a second outer surface of the power storage module in the second direction.

* * * * *